United States Patent
Greiff et al.

(10) Patent No.: US 6,705,846 B2
(45) Date of Patent: Mar. 16, 2004

(54) PISTON PUMP

(75) Inventors: Uwe Greiff, Bad Homburg (DE); Albrecht Otto, Schöneck (DE); Helmut Steffes, Hattersheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 54 days.

(21) Appl. No.: 10/301,340

(22) Filed: Nov. 21, 2002

(65) Prior Publication Data

US 2003/0072661 A1 Apr. 17, 2003

Related U.S. Application Data

(62) Division of application No. 09/554,384, filed as application No. PCT/EP98/07265 on Nov. 13, 1998, now Pat. No. 6,497,562.

(30) Foreign Application Priority Data

| Nov. 14, 1997 | (DE) | 197 50 458 |
| Feb. 17, 1998 | (DE) | 198 06 528 |
| May 6, 1998 | (DE) | 198 20 136 |

(51) Int. Cl.$^7$ .............................. F04B 39/10
(52) U.S. Cl. .............. 417/560; 417/561; 417/567
(58) Field of Search .................. 417/549, 550, 417/560, 545, 552, 562, 567

(56) References Cited

U.S. PATENT DOCUMENTS

| 4,032,263 A | 6/1977 | Pareja |
| 4,551,077 A | 11/1985 | Pacht |
| 4,878,815 A | 11/1989 | Stachowiak |
| 6,497,562 B1 * | 12/2002 | Greiff et al. ............ 417/560 |

FOREIGN PATENT DOCUMENTS

| DE | 1165364 | 3/1964 |
| DE | 46946 | 7/1966 |
| DE | 6608701 | 6/1971 |
| DE | 3208770 | 9/1983 |
| DE | 3527532 | 2/1987 |
| DE | 3742824 | 6/1989 |
| DE | 3835906 | 4/1990 |
| DE | 4126959 | 2/1993 |
| DE | 4200997 | 7/1993 |
| DE | 4217910 | 12/1993 |
| DE | 4239362 | 5/1994 |
| DE | 4309243 | 9/1994 |
| DE | 4329211 | 3/1995 |
| DE | 4407978 | 9/1995 |
| DE | 19518206 | 11/1996 |
| EP | 0631050 | 12/1994 |
| FR | 1486776 | 10/1967 |

OTHER PUBLICATIONS

Search Report of the German Patent Office for Appln 19820136.2.

Search Report of the German Patent Office for Appln 19822917.8.

* cited by examiner

Primary Examiner—Thor Campbell
(74) Attorney, Agent, or Firm—Rader, Fishman & Grauer PLLC

(57) ABSTRACT

In a piston pump, in particular for pressure medium delivery in slip-controlled hydraulic brake systems, including a suction valve and a delivery valve, external preassembly and possibilities of external testing of the delivery and suction valves result from providing the suction valve and the delivery valve within a component which can be handled independently. The component preferably includes a delivery valve provided radially to the center line and a valve seat member, with a valve body of the delivery valve being prestressed by a tongue of a clamp, placed onto the valve seat member, against a valve seat formed within the valve seat member.

14 Claims, 8 Drawing Sheets

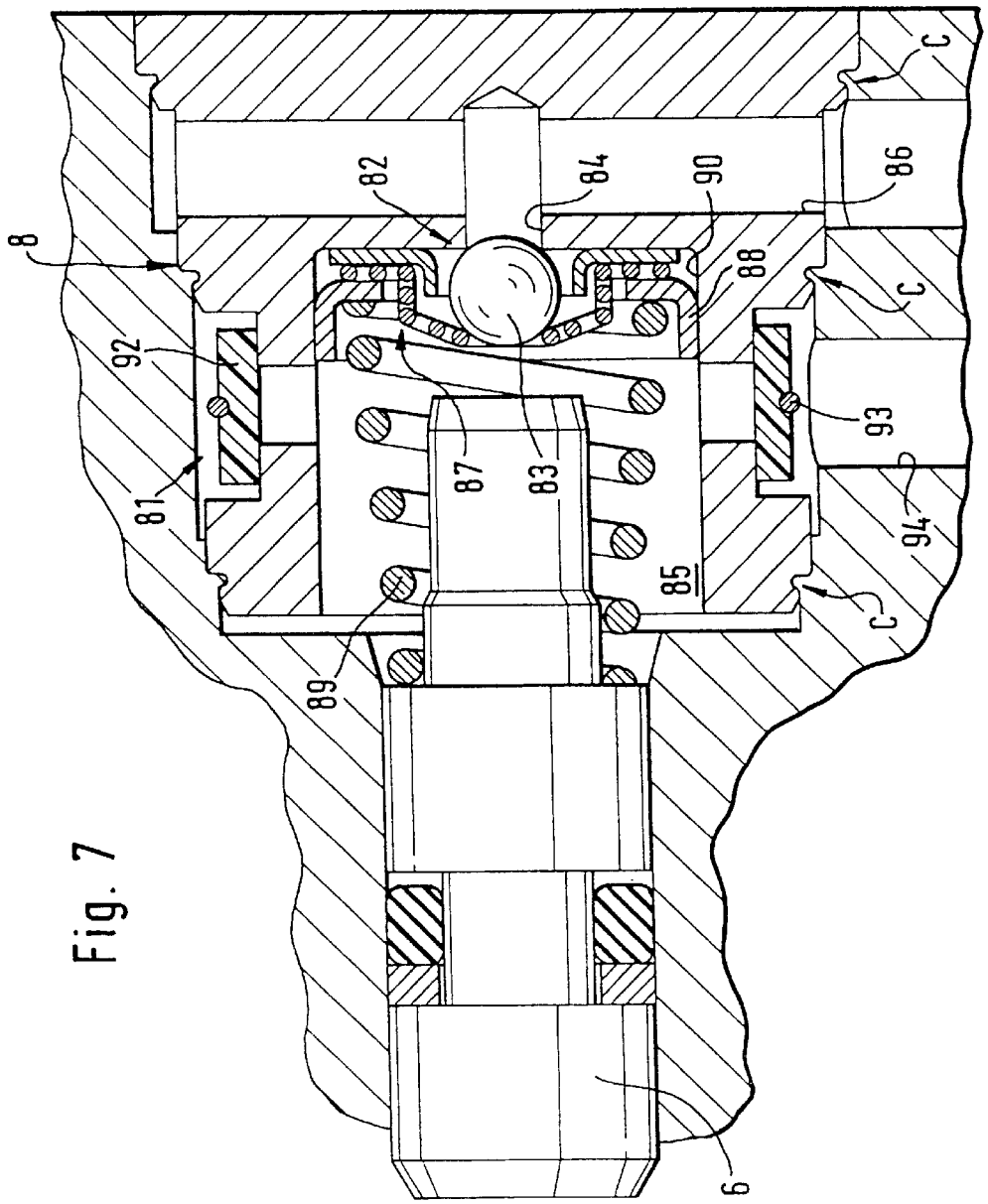

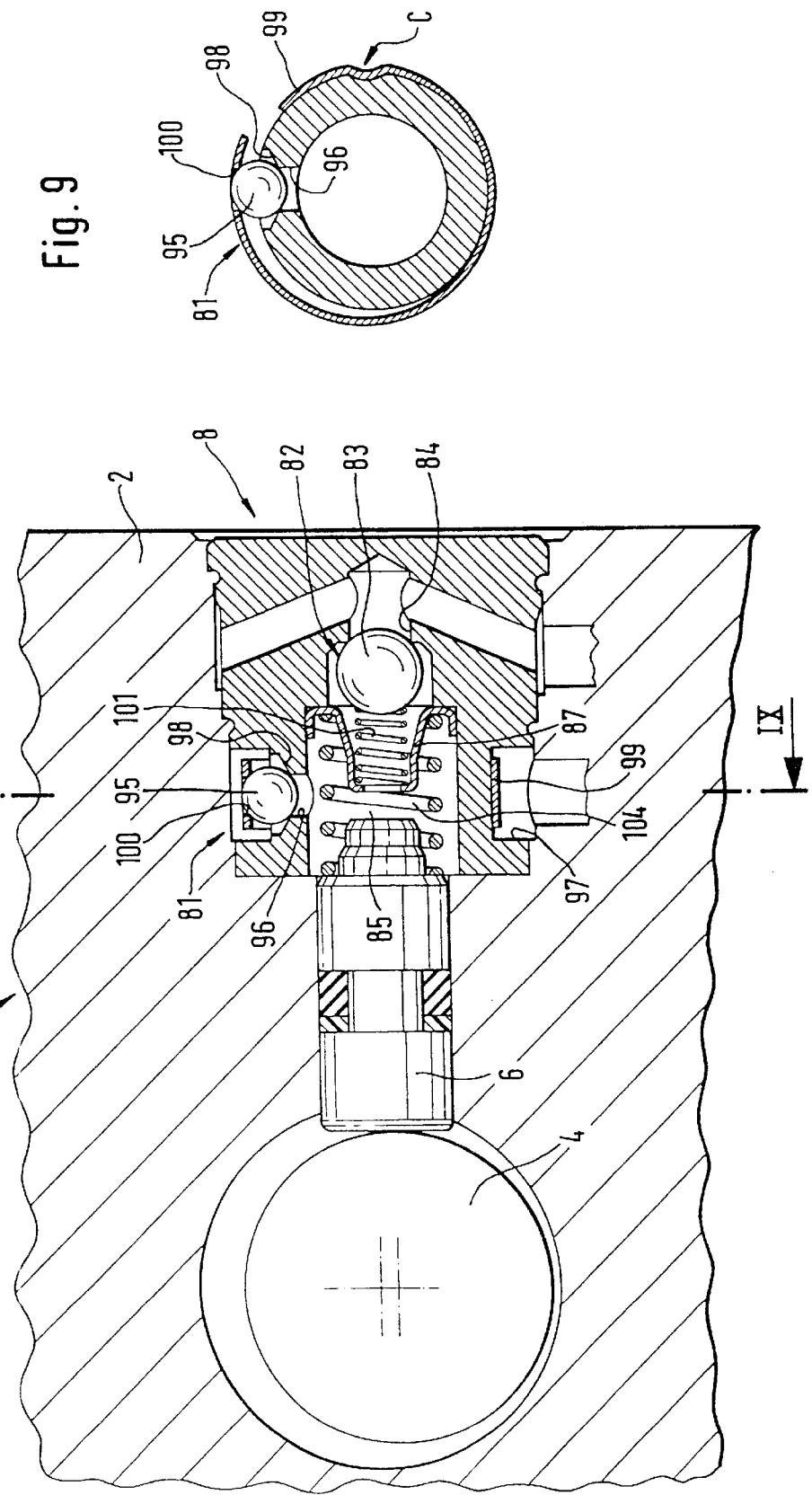

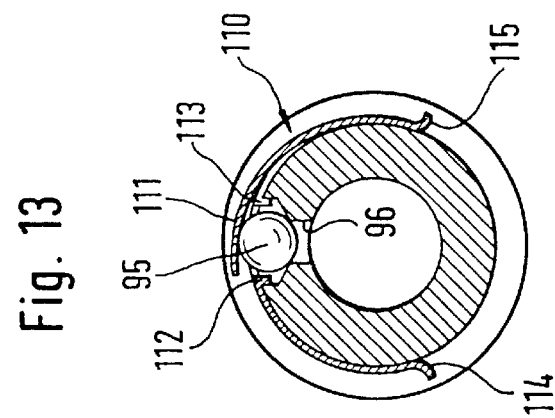
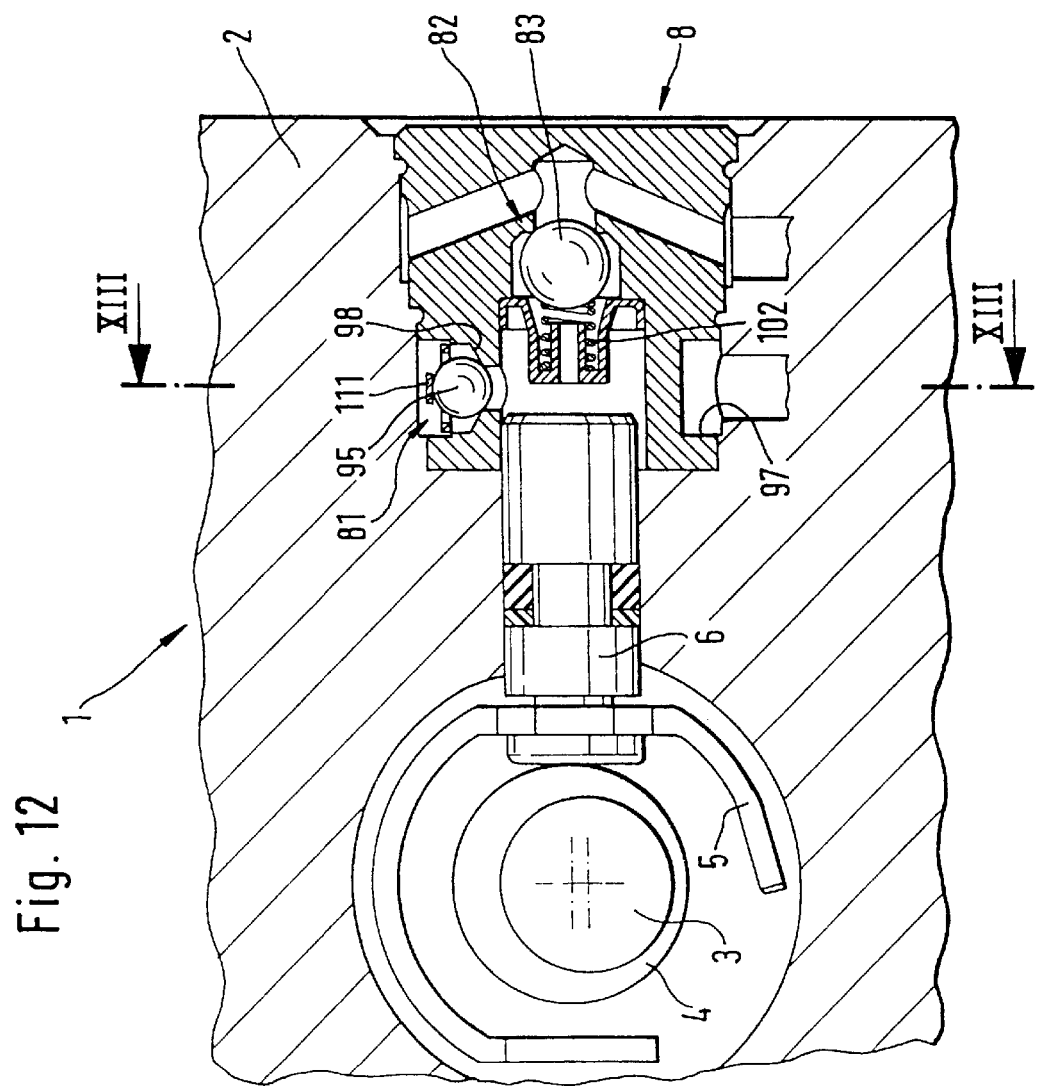

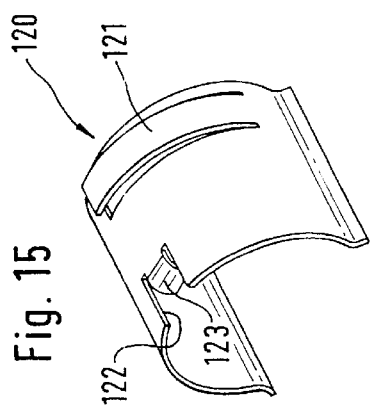
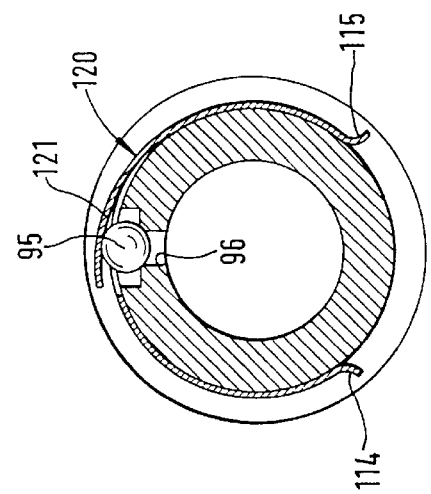
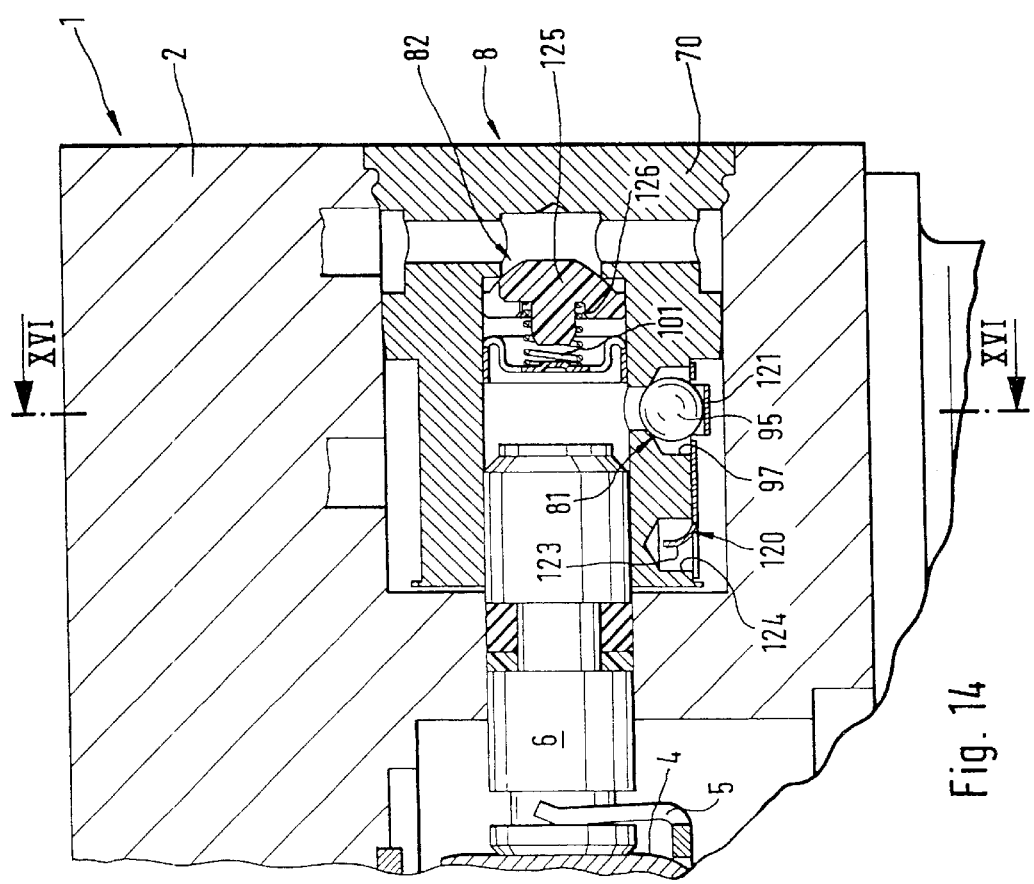

PISTON PUMP

TECHNICAL FIELD

The present invention generally relates to a piston pump, and more particularly relates to a piston pump used in slip-controlled hydraulic brake systems.

BACKGROUND OF THE INVENTION

Such a piston pump, e.g., is known from EP 0 631 050 B1. The piston pump according to this prior art includes a delivery valve and a suction valve, both arranged within a pump housing so that they are separate from each other in terms of location and construction. Moreover, the known delivery and suction valves are assembled within the pump housing one after the other in terms of time and, once assembled, it is no longer possible to test them without a major effort. However, before assembly, it is likewise not readily possible to perform an optimum test of these valves since in such a case the assembled conditions would have to be simulated as accurately as possible and since the valves could be tested only separately.

A ball-type-design delivery valve is known particularly in the context of the examples of embodiments of a known piston pump as disclosed in FIGS. 11 through 19 of EP 0631 050 B1. There, a valve body having the design of a ball is prestressed, with a ring means being used, against a valve seat designed as radial bore. This known delivery valve has disadvantages in that the assembly of the ring means on the valve seat member of the delivery valve requires a major effort and in that its type of fastening is not particularly stable. In this known arrangement it is moreover possible that the ring means twists or is displaced and, thus, the ball slips out of its valve seat or there is a change in the pre-stressing force.

It is an object of the present invention to avoid the disadvantages of prior art and, in particular, to provide a piston pump enabling both the delivery valve and the suction valve to be preassembled and tested before being assembled into a pump housing, i.e., enabling external preassembly and testing.

This inventive task is solved in a generic piston pump in that the delivery valve and the suction valve are provided on a component which can be handled independently.

An essential advantage of the present invention consists in that the inventive design of the delivery and suction valves provides a valve cartridge unit allowing external preassembly and testing. Moreover, it is possible to reduce the number of parts used as well as the rejects of defective units and, consequently, the cost of manufacture. A further advantage of this invention is the fact that the time needed for assembling the inventive piston pump is considerably reduced which likewise means a drop in costs. The constructional combination of delivery valve and suction valve, moreover, results both in space being saved and in an optimum utilization of the space available for the valves within the pump housing. Finally, the constructional combination of delivery and suction valves permits a simple recessing of the valve seat member as no separate valves have to be accommodated within the pump body.

In a preferred embodiment of this invention, the component is fastened within the pump housing by means of caulking or clinching. This type of fastening is beneficial in terms of cost and enables pressure-tight assembly of the component within the pump housing. Further, this restricts the possibilities of inexpert manipulation of the brake system.

So as to reduce the number of parts required for assembling the component it is an advantage to provide one spring element for jointly prestressing the delivery valve and the suction valve. This spring element may have the design of a compression spring or of a tension spring.

Advantageously, the component includes a valve seat member wherein there is provided a valve seat for the delivery valve and a valve seat for the suction valve. This results in an especially space-and-material-saving design of the component of the inventive piston pump.

According to a further embodiment of this invention, the piston pump includes a cup-shaped pump piston, with the component including an axially projecting gudgeon portion wherethrough the cup-shaped piston is guided. An advantage of this embodiment is the fact that the pump housing does not have to undergo hardening or anodizing.

Advantageously this component includes a valve seat member with an axial recess formed on one of its front sides for guiding the pump piston of the piston pump therein or rather for having it plunge into this recess. Preferably, the suction valve is arranged on the other, opposite front side of the valve seat member essentially axially to the center line of the valve seat member while the delivery valve is arranged essentially radially to said line. This arrangement is particularly space-saving as the pump piston, together with its resetting spring, can plunge into the recess whereby the length of the bore wherein the pump piston moves is shortened.

According to a variant of this invention, the suction valve includes a compression spring secured by means of a bowl-type spring retainer provided with a stop formed thereon for the valve body of the suction valve and further including means for guiding the compression spring and means for guiding a piston return spring serving to reset the piston. The bowl-type spring retainer thus combines a plurality of different functions which means a saving of space and material. Further, the design of the stop for the suction valve body prevents the suction valve body from becoming jammed within the bowl-type spring retainer.

Advantageously, the means for guiding the compression spring and the means for guiding the piston return spring form a cup-shaped portion of the bowl-type spring retainer, with the compression spring being guided on the inside of the cup-shaped portion and the piston return spring being guided on the outside of the cup-shaped portion. The stop of the bowl-type spring retainer preferably serves as an internal guideway for the compression spring. This is particularly beneficial since the bowl-type spring retainer, due to its function as a retaining cage for the suction valve body, is anyway concave, i.e., provided with a cup-shaped portion and since, further, the bowl-type spring retainer anyway includes a stop in order to prevent the suction valve closure member from becoming jammed within the bowl-type spring retainer.

In accordance with this invention, further provided is a delivery valve with a valve seat member, in particular for a piston pump, with a valve body of the delivery valve being prestressed by a clamping element, mountable to the valve seat member, against a valve seat formed within the valve seat member. Particularly advantageous is the fact that the clamping element includes a tongue which is formed thereon and prestresses the valve body against the valve seat. The use of this inventive tongue instead of, for instance, a helical spring is possible because the opening pressure of the delivery valve does not have to be adjusted as accurately as that of the suction valve. It is thus possible to substitute the helical spring in the delivery valve for a tongue provided on the clamping element. The tongue urges the valve body perpendicularly onto the valve seat while simultaneously fixing the valve body axially and radially. Fixation of the valve body may even be improved by means of a bore which can additionally be provided within the tongue and at least partially is engaged by the valve body. Further, the arrangement of the tongue on the clamping element also offers the advantage of adjustability of the resiliency over the length of the tongue, even with a predetermined construction of the valve body. Finally, the arrangement of the tongue within the clamping element offers sufficient surface contact between the clamping element and the valve seat member, namely by means of the surfaces adjoining the tongue, whereby the clamping element can much better be fastened on the valve seat member.

Preferably, the clamping element has a tab, provided perpendicularly to the tongue, for fastening the clamping element on the valve seat member. Thus it is possible to a great extent to prevent the clamping element from twisting and getting loose.

In a preferred embodiment of this invention, the clamping element includes at least one tab, provided parallel to the tongue, for fastening the clamping element in a valve seat member recess serving to receive the valve body. This does not require a separate bore in the valve seat member for fastening the tab.

If the clamping element is dimensioned considerably wider than the valve body, the larger contact surface between clamping element and valve seat member results in an improved fastening of the clamping element on the valve seat member because of only the tension of the clamping element.

So as to facilitate the radial slipping-on of the clamping element onto the valve seat member the cross sides of the clamping element preferably include end portions arched outwards. Slipping-on, however, may also be done axially, starting from an end portion of the valve seat member.

BRIEF DESCRIPTION OF THE DRAWINGS

FIG. 7 is a view of a longitudinal section of a seventh example of an embodiment of the present invention.

FIG. 8 is a view of a longitudinal section of an eighth example of an embodiment of the present invention.

FIG. 9 is a cross-sectional view of an inventive delivery valve along line IX—IX of FIG. 8.

FIG. 12 is a view of a longitudinal section of a tenth example of an embodiment of the present invention.

FIG. 13 is a cross-sectional view of a further embodiment of an inventive delivery valve along line XIII—XIII of FIG. 12.

FIG. 14 is a view of a longitudinal section of an eleventh example of an embodiment of the present invention.

FIG. 15 is a perspective view of a retaining bow for being used on the inventive delivery valve as per FIG. 14.

FIG. 16 is a cross-sectional view along line XVI—XVI of FIG. 14 of a preferred embodiment of an inventive delivery valve.

DETAILED DESCRIPTION OF THE PREFERRED EMBODIMENTS

Figure 1:
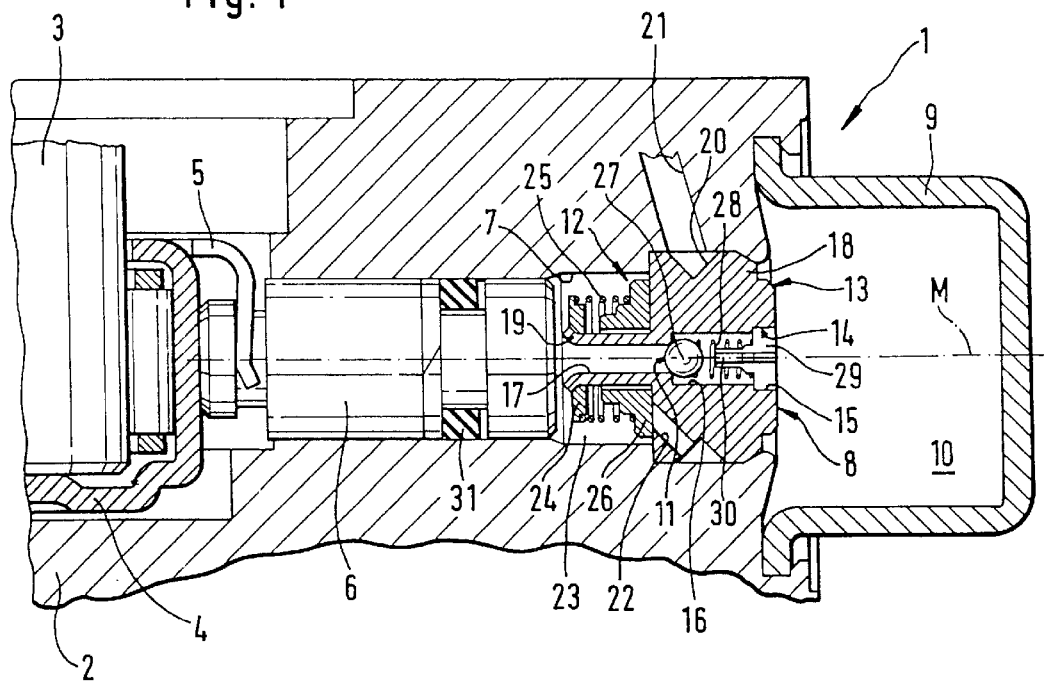
FIG. 1 is a view of a longitudinal section of a first example of an embodiment of the present invention.

FIG. 1 represents a view of a longitudinal section of a first example of an embodiment of an inventive hydraulic pump or rather piston pump 1 preferably used in an ABS (Anti-lock Braking System), TCS (Traction Control System) or ESP (Electronic Stability Program) system of a controlled vehicle brake apparatus. Within its housing 2, the hydraulic pump 1 constructed as a piston pump includes an eccentric 4 driven by a drive shaft 3. In this example of an embodiment, a pump piston 6 is connected with a non-illustrated second pump piston via a coupling ring 5 and is thus in contact with eccentric 4. During the rotation of the drive shaft 3, the pump piston 6 is linearly reciprocating within a stepped bore 7 of pump housing 2. A component 8 such as a cartridge seals the end of stepped bore 7, lying opposite eccentric 4, in a pressure-tight manner. Cartridge 8 is fastened within the pump housing 2 by means of, e.g., caulking or clinching. On the outside of the cartridge or rather component 8, an outwards bulging cap 9 forms a pressure damping chamber 10. According to this invention, cartridge 8 includes a pressure-controlled delivery valve 11 and a pressure-controlled suction valve 12. The valve cartridge 8 may be preassembled and tested outside the valve block or rather outside pump housing 2. Delivery valve 11 includes a valve seat member 13. Valve seat member 13 includes a central bore 14 the center line M of which coincides with the longitudinal axis of pump piston 6. As seen from the outside to the inside, central bore 14 of the valve seat member 13 includes three stepped sections 15, 16, and 17. The diameter of the outsidemost section 15 is larger than the diameter of the mid-section 16 while the latter, on its part, is larger than that of the innermost section 17. The valve seat member 13 includes an outer end portion 18 and an opposite, sleeve-type, inner end portion 19. The stepped sections 15, 16 and part of stepped section 17 of bore 14 are formed within end portion 18. The sleeve-type end portion 19 of valve seat member 13 likewise includes part of stepped section 17 of bore 14. The end portion 18 of valve seat member 13 includes an annular channel 20 formed along its outside periphery and leading to a non-illustrated low-pressure accumulator via a schematically indicated bore 21. When the suction valve 12 is open a bore 22 extending obliquely to line M connects annular channel 20 with a chamber 23 confined by piston 6, with end portion 19 of valve seat member 13 projecting into chamber 23. The end of end portion 19 of the valve seat member 13 which faces piston 6 is bent outwards in order to receive a retaining ring 24 slipped onto end portion 19. A compression spring 25 supports itself on a step formed on the retaining ring 24, on the one hand, and on a step formed on a valve element 26 of suction valve 12, on the other hand. Valve element 26 serves as closure member of suction valve 12. Compression spring 25 prestresses valve element 26 against its seat, i.e., a front side of the valve seat member 13 facing piston 6 and lying radially outside end portion 19. In this position of suction valve 12, chamber 23 does not communicate with the low-pressure accumulator. A step between sections 16 and 17 of bore 14 forms a valve seat for a valve element of delivery valve 11. Said valve element preferably has the design of a ball 27. Ball 27 is prestressed by a compression spring 28 against its seat while the end of compression spring 28 which is opposite of ball 27 supports itself on a plug 29 arranged within bore 14. Plug 29 includes a pin element 30, projecting inside, for guiding compression spring 28. The outside diameter of pin element 30 approximately corresponds to the inside diameter of compression spring 28.

During the operation of the inventive hydraulic pump 1, the pressure of brake fluid is increased in chamber 23 in a delivery stroke phase wherein pump piston 6 moves to the right according to the view of FIG. 1. To this end, a seal 31 is provided around the periphery of pump piston 6. The pressurized brake fluid in chamber 23 now presses the ball 27, against the prestress of compression spring 28, away from its seat whereby pressurized brake fluid is transferred to a pressure medium consumer such as the wheel brakes. In a suction phase, while pump piston 6 moves to the left according to the view of FIG. 1, delivery valve 11 remains closed, i.e., under the action of compression spring 28 ball 27 is pressed against its valve seat formed on the bordering surface of sections 16 and 17. During this suction stroke phase, the relative pressure reduction of the brake fluid in pressure chamber 23 opens suction valve 12. Then, pressure medium is sucked into pressure chamber 23 via the low-pressure accumulator, bore 21, annular channel 20 and bore 22.

Figure 2:
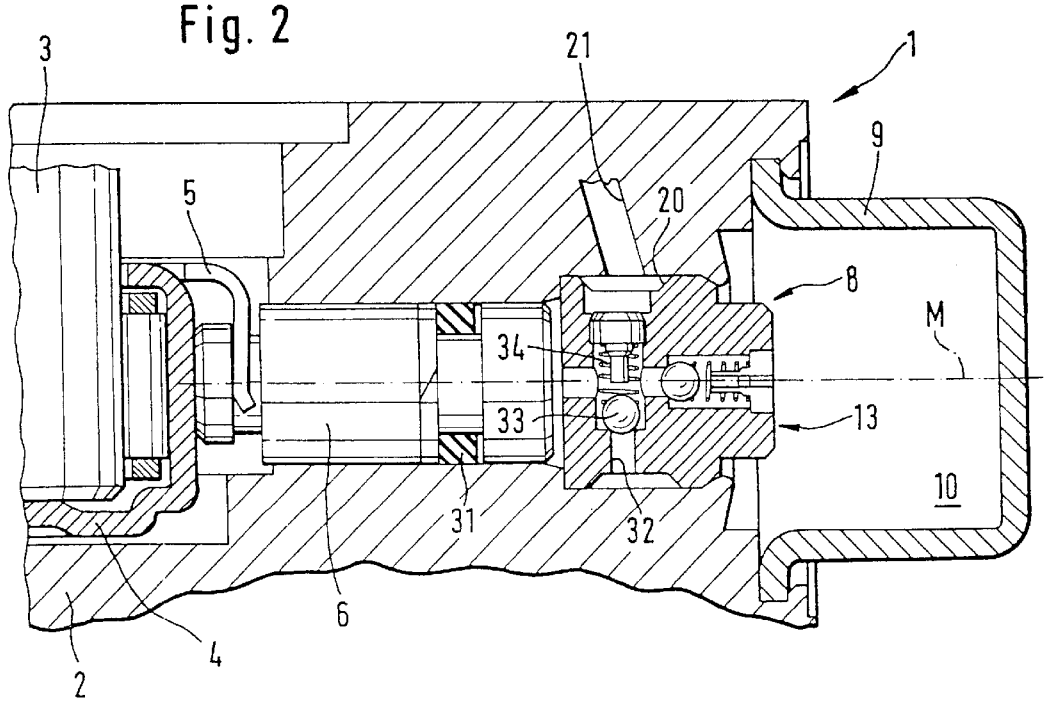
FIG. 2 is a view of a longitudinal section of a second example of an embodiment of the present invention.

FIG. 2 represents a view of a longitudinal section of a second example of an embodiment of the present invention. As distinguished from the first example of an embodiment of the present invention already described in the context of FIG. 1, the example of an embodiment according to FIG. 2 features a different design of cartridge 8. According to the second example of an embodiment of the present invention represented in FIG. 2, suction valve 12 of cartridge 8 is designed as a ball-type valve just as delivery valve 11, with the arrangement of suction valve 12 within cartridge 8 approximately being perpendicular to that of delivery valve 11. Cartridge 8 therefore includes a stepped radial bore 32 besides axial bore 14 provided for delivery valve 11. A ball 33 serving as valve body and prestressed by a compression spring 34 against a step formed within radial bore 32 is the closure member of suction valve 12.

Figure 3:
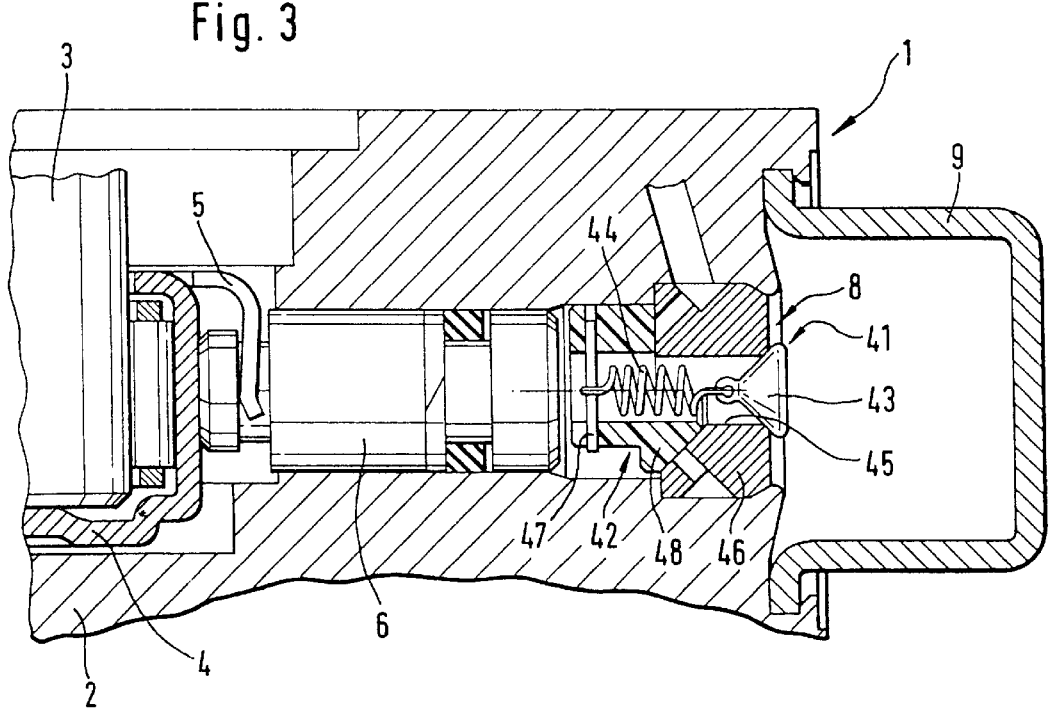
FIG. 3 is a view of a longitudinal section of a third example of an embodiment of the present invention.

FIG. 3 represents a view of a longitudinal section of a third example of an embodiment of the present invention. In general, the design of the hydraulic pump 1 represented in FIG. 3 is similar to the design of hydraulic pump 1 already described in the context of FIGS. 1 and 2. However, the main differences between the example of an embodiment of this invention, represented in FIG. 3, and those two first examples of embodiments of this invention lie in the design of cartridge 8. Within cartridge 8, a delivery valve 41 and a suction valve 42 are constructionally combined. Instead of a ball 27 (cf. FIGS. 1 and 2), delivery valve 41 includes as valve body a conical valve tappet 43 preferably made of steel or plastic and prestressed by a tension spring 44 against its valve seat, namely a central bore 45, within valve seat member 46 of delivery valve 41. One end of tension spring 44 is fastened to a fastening eyelet or the like of valve tappet 43. Via a retaining element 47, the opposite end of tension spring 44 is connected with an essentially conical (lower half of drawing) or plane (upper half of drawing) closure member 48 of suction valve 42. Closure member 48 is a ring made of plastic. In the third example of an embodiment of the present invention represented in FIG. 3, thus, only one sole spring means, namely tension spring 44, is provided for prestressing the valve tappet 43 of delivery valve 41 and the closure member 48 of suction valve 42.

Figure 4:
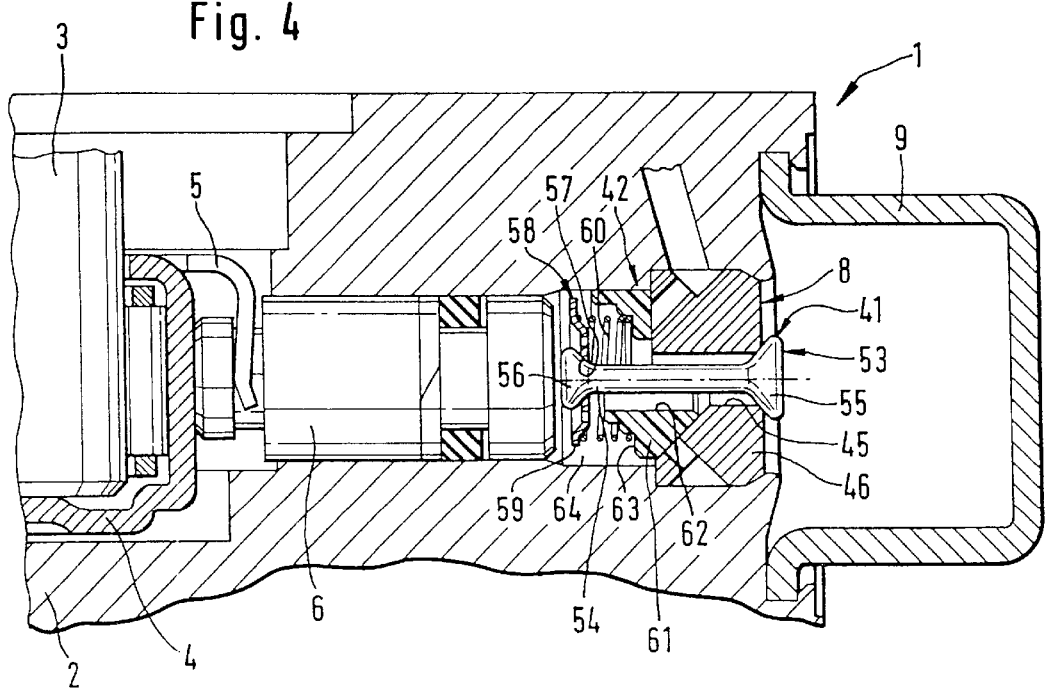
FIG. 4 is a view of a longitudinal section of a fourth example of an embodiment of the present invention.

Referring to FIG. 4, a fourth example of an embodiment of the present invention is described. The fourth example of an embodiment of the present invention, represented by a view of a longitudinal section, in general is similar to the third example of an embodiment of this invention represented in FIG. 3. However, the design of the valves, namely of delivery valve 41 and suction valve 42, combined within valve cartridge 8 is different from the above-described variants of this invention. Delivery valve 41 includes a valve seat member 46 with a central bore 45 serving on its outside as a seat for a valve tappet 53. Valve tappet 53, preferably made of steel or plastic, includes a pin portion 54 and two end portions 55, 56 conically flaring outwards. End portion 55 serves as valve body for delivery valve 41 (cf. valve tappet 43 as per FIG. 3), while end portion 56 serves to support the valve tappet 53 within a central bore 57 of a retaining plate 58. An especially inwards- bent outside-periphery portion 59 of retaining plate 58 is provided for the support of a compression spring 60 designed as a helical spring. Suction valve 42 has an annular closure member 61 made of plastic. Closure member 61 comprises a central bore 62 wherein valve tappet 53 moves. On its front side facing pump piston 6, closure member 61 of suction valve 42 includes an annular step 63 serving to support and guide compression spring 60. On its front side averted from pump piston 6, closure member 61 is conical or plane and abuts on a mating valve seat, formed within the valve seat member 46, when suction valve 42 is closed. Compression spring 60 presses closure member 61 of suction valve 42 against its seat in order to prestress suction valve 42 into the closed condition and further presses end portion 55 of valve tappet 53 against its seat in order to prestress delivery valve 41 into its closed condition. The pump piston 6 moving to the right according to the view of FIG. 4 during a delivery stroke, the pressurized brake fluid opens delivery valve 41. In doing so, the hydraulic pressure of the brake fluid acts against the prestressing force of the compression spring 60. The pump piston 6 moving to the left according to the view of FIG. 4 during a suction stroke phase, the relative vacuum forming within chamber 64 ensures the opening of the suction valve 42 against the prestressing force of compression spring 60.

Please note that the respectively third and fourth examples of embodiments of the present invention represented in FIGS. 3 and 4 are advantageous in that only one spring element is required for both the delivery valve 41 and the suction valve 42. As compared with the examples of embodiments as per FIGS. 1 and 2, this saves one spring so that the (valve) cartridge 8 in accordance with the third and fourth examples of embodiments includes only 5 elements, namely valve seat member 46, closure member 48 or 61, respectively, retaining element 47 or retaining plate 58, respectively, tension spring 44 or compression spring 60, respectively, and valve tappet 43 or 53, respectively.

Figure 5:
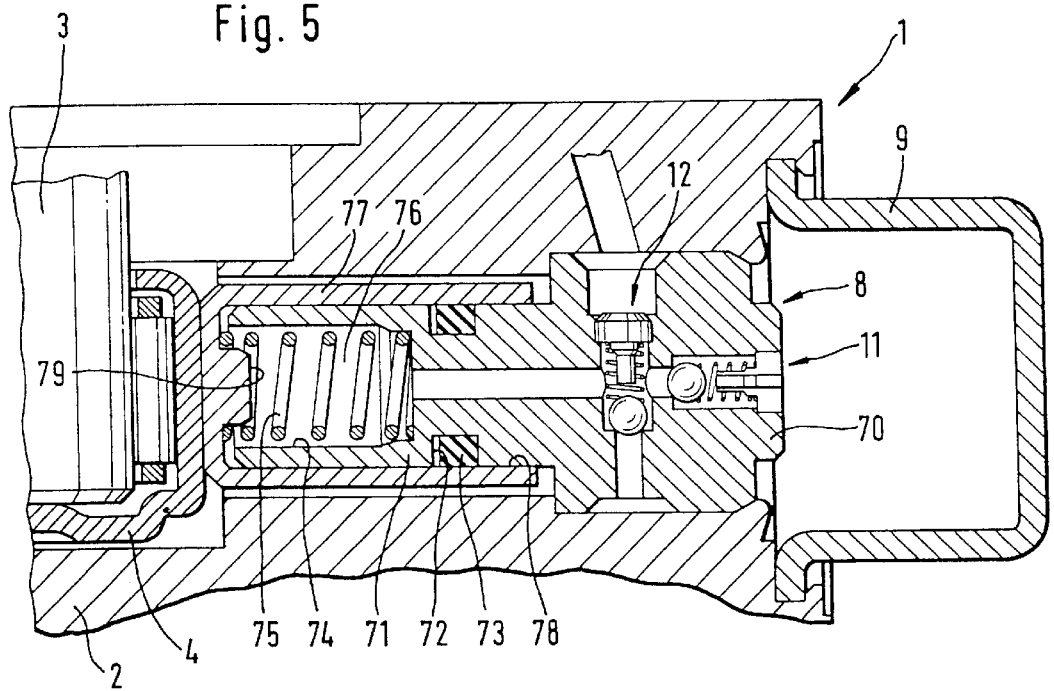
FIG. 5 is a view of a longitudinal section of a fifth example of an embodiment of the present invention.

FIG. 5 represents a view of a longitudinal section of a fifth example of an embodiment of the present invention. The design of valve cartridge 8 in accordance with FIG. 5 in general is similar to the design of valve cartridge 8 as per the second example of an embodiment described in the context of FIG. 2. This is particularly true in so far as cartridge 8 includes an axial delivery valve 11 on one end portion and a suction valve 12 provided radially thereto. What is different from the example of an embodiment of FIG. 2 is that cartridge 8 includes a valve seat member 70 provided with a gudgeon 71 preferably made of steel and formed inwards or rather towards eccentric 4. A peripheral groove 72 is provided on gudgeon 71 and serves to receive a gasket 73. Designed on the front side of gudgeon 71, in FIG. 5, is a stepped bore 74 serving to receive a compression spring or rather a piston return spring 75 and forming a chamber 76. The pump piston driven by the eccentric 4 is designed as cup-shaped piston 77. The cup-shaped piston 77 includes a bore 78 the inside diameter of which approximately corresponds to the outside diameter of gudgeon 71. Designed on a bottom section of bore 78 is an axial projection 79 the outside diameter of which essentially corresponds to the inside diameter of compression spring 75. The outside diameter of projection 79 slightly tapers outwards so as to facilitate the assembly of compression spring 75. The cup-shaped piston 77 is preferably made of steel and, e.g., may be an extruded part. This allows the play between the cup-shaped piston 77 and gudgeon 71 to be kept very small because of almost the same coefficients of expansion. Besides, there is no further need for the housing 2 to be anodized or hardened. This prevents any pollution caused by clinching in or rather by caulking the valves and caps. It is noticed from FIG. 5 that compression spring 75 is arranged within the cup-shaped piston 77 and, more precisely, within a chamber 76 formed by the cup-shaped piston 77 and gudgeon 71.

Figure 6:
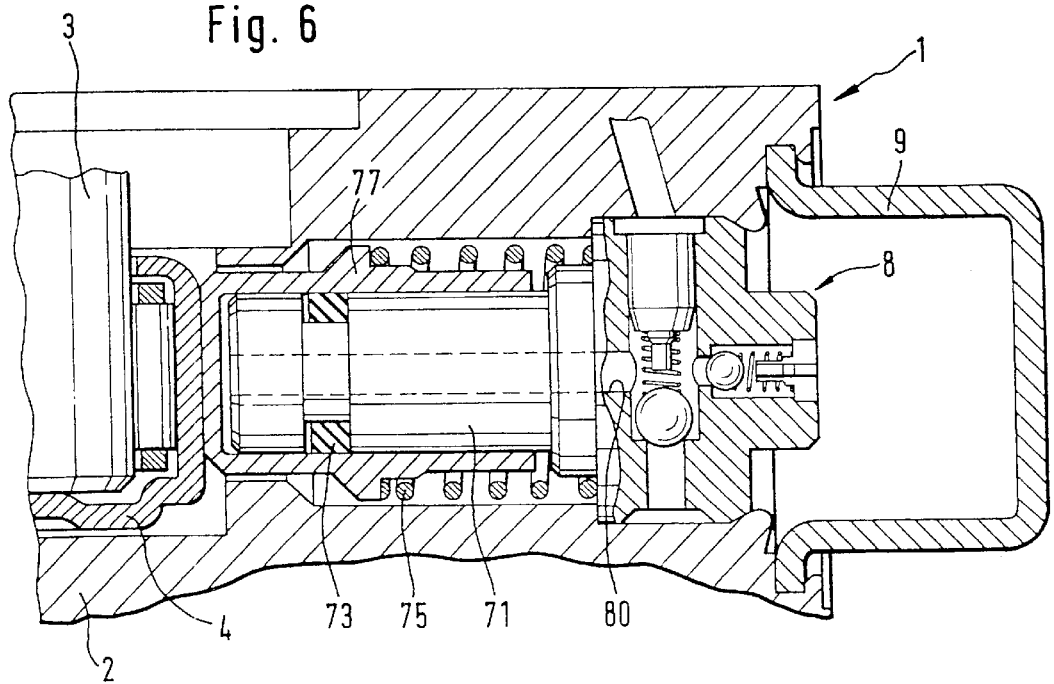
FIG. 6 is a view of a longitudinal section of a sixth example of an embodiment of the present invention.

Regarding the sixth example of an embodiment of the present invention represented in FIG. 6, what is different from the example of an embodiment of the present invention represented in FIG. 5 is that compression spring 75 serving to reset the cup-shaped piston 77 is supported on a step formed on the outside of the cup-shaped piston 77. On its opposite side, compression spring 75 is supported and guided on a step of valve seat member 70, this step being formed by the bottom of gudgeon 71. Also serving as chamber or rather as compression chamber 76 in this example of an embodiment according to FIG. 6 is, inter alia, an axial bore 80 within gudgeon 71.

Please note that, as contrasted with the examples of embodiments represented in FIGS. 1 through 4, the examples of embodiments of the present invention represented in FIGS. 5 and 6 are provided with compression spring 75 for resetting the cup-shaped piston 77 instead of with coupling ring 5.

A seventh example of an embodiment of the present invention is schematically represented in FIG. 7. The cartridge 8 represented in FIG. 7 includes a delivery valve 81 and a suction valve 82. The suction valve 82 designed in the center of the valve seat member includes a valve body which has the design of a ball 83 and which, in the closed condition of suction valve 82, abuts on a valve seat formed on a bore 84. The valve body may be a plate or the like instead of ball 83. Please note that the design of the cartridge 8 represented in FIG. 7 essentially is characterized by rotation symmetry which simplifies manufacture. Bore 84 is formed on a front side of cartridge 8 and is axially centered. Bore 84 connects the pressure or compression chamber 85 with a channel 86 leading to a (non-illustrated) low-pressure accumulator. Ball 84 is held by a retaining cage 87. A compression spring 89, provided between pump piston 6 and a retaining ring 88 and essentially arranged within compression chamber 85, takes care of the required resetting of the pump piston 6 during operation. Simultaneously, compression spring 89 serves to keep the retaining cage 87, via retaining ring 88, on the bottom of recess 90 provided within cartridge 8 and forming compression chamber 85. Preferably, the retaining ring 88, however, is also pressed into the cartridge or rather into component 8. While in the example of an embodiment as per FIG. 7 the suction valve is arranged axially on the end of cartridge 8 which is opposite of pump piston 6 the delivery valve 81 has an annular plate 92 as closure member. This annular plate 92, e.g., may be a slotted ring of plastic. Plate 92 is prestressed against cartridge 8 by means of a wire circlip 93 so that, in the closed condition, delivery valve 81 ensures a pressure medium tightness between compression chamber 85 and the channel 94 leading to a pressure medium consumer. It is noticed from the representation of FIG. 7 that the valve seat member of cartridge 8 is provided with three clinch-type connections or rather caulkings marked by reference mark C for pressure-tight assembly within a pump housing. Please note that the example of an embodiment of the present invention, represented in FIG. 7, is particularly advantageous in that the inside of the valve seat member of cartridge 8 is designed in a particularly space-and-material-saving manner by providing the compression chamber 85 which, e.g., may axially be recessed.

Referring to FIGS. 8 and 9, an eighth example of an embodiment of the present invention is explained. The eighth example of an embodiment of the present invention, represented in FIGS. 8 and 9, in general resembles the seventh example of an embodiment of the present invention, represented in FIG. 7, yet differs from the same essentially in that delivery valve 81 features a modified design. Delivery valve 81 as per FIGS. 8 and 9 includes a valve body preferably designed as a ball 95 and provided within a radial bore 96 within a section of cartridge 8, facing pump piston 6. This valve body consists of a suitable material, preferably of steel or plastic. Radially outside bore 96, within cartridge 8, a peripheral groove 97 is formed which includes a particularly conical section 98 in the location of bore 96. A retaining bow 99 acting as a leaf spring serves to prestress ball 95 against its valve seat formed by conical section 98. The use of a leaf spring for delivery valve 81 is possible because of the fact that the opening pressure of delivery valve 81 does not require as accurate an adjustment as that of suction valve 82. Therefore, no helical spring is needed for delivery valve 81. Moreover, the opening pressure of the delivery valve is not as decisive as that of the suction valve wherefore the effective sealing seat diameter may be rated smaller. It is noticed from the representation of FIG. 9, in particular, that retaining bow 99, essentially extending over almost the entire periphery of cartridge 8, includes a hole 100 in the location of ball 95. Hole 100 serves to fix ball 95 on the valve seat so that, after assembly having been performed, ball 95 cannot slip out of the cartridge unit. Retaining bow 99 is positively and/or frictionally and operatively fixed on cartridge 8 by, e.g., the caulking C as represented in FIG. 9 in order to prevent bow 99 from twisting. Please note that, in accordance with the representation of FIG. 8, the cross-section of bore 84 is larger than that of bore 96 which is due to the fact that, when sucking brake fluid, little throttling action and hence a larger effective suction cross-section is desirable for the suction valve 82. As distinguished from the example of an embodiment described in the context of FIG. 7, the eighth example of an embodiment of the present invention, represented in FIG. 8, includes a compression spring 101 between the retaining cage 87 which is preferably made of sheet metal and which also may be referred to as bowl-type spring retainer and ball 83 of suction valve 82. This enables exact adjustment, i.e., without any great tolerances, of the opening pressure of suction valve 82. Along its inside periphery, retaining cage 87 likewise serves to guide compression spring 101. Preferably together with compression spring 101, frictionally held within retaining cage 87, retaining cage 87 is pressed into the valve housing so as to abut thereon. Fixation of retaining cage 87 may alternatively also happen by means of one or a plurality of undercuts, provided within the valve housing or rather within cartridge 8, and by means of catches shaped on retaining cage 87 and (not illustrated) engaging the undercuts. The suction valve 82 assembled, retaining cage 87, along its outside periphery, likewise serves to guide piston return spring 104. Piston return spring 104 is provided with a stronger resiliency than compression spring 101 in order to ensure that compression spring 101 cannot push retaining cage 87 out. Please note that in the eighth example of an embodiment of the present invention the various pressure chambers are connected by means of clinching or by means of a "fir-cone-type" connection. Therefore, no separate sealing elements are required.

Figure 11:
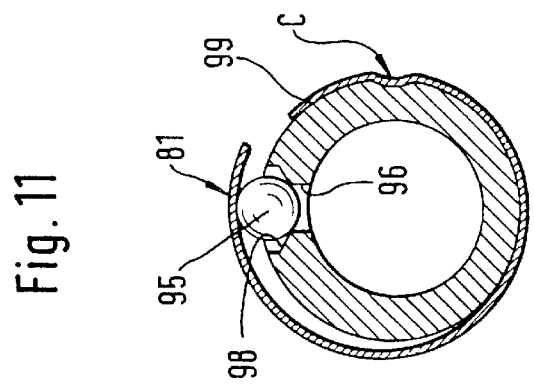
FIG. 11 is a cross-sectional view of a further embodiment of an inventive delivery valve along line XI—XI of FIG. 10.
Figure 10:
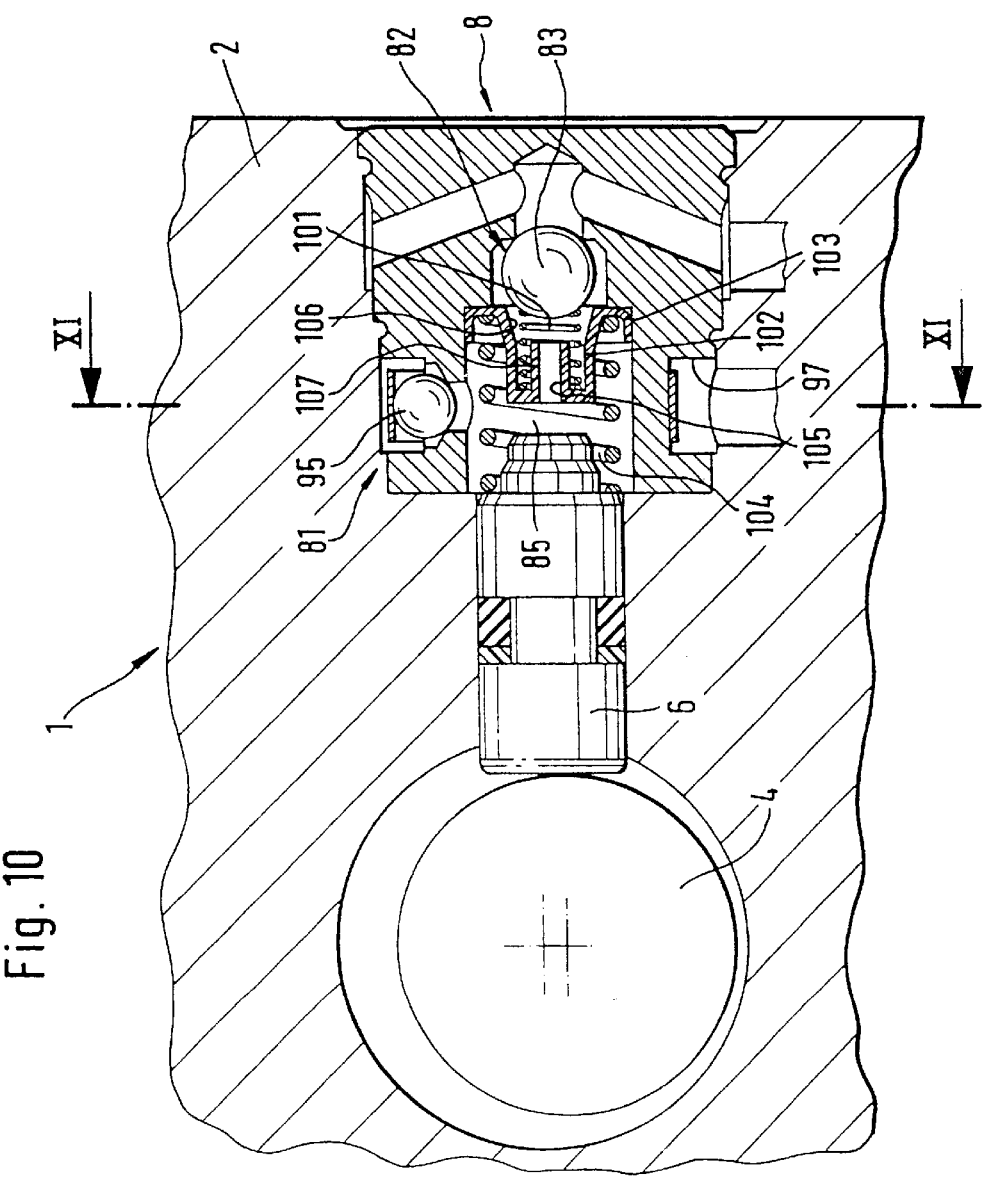
FIG. 10 is a view of a longitudinal section of a ninth example of an embodiment of the present invention.

FIGS. 10 and 11 schematically represent a ninth example of an embodiment of the present invention. As distinguished from the eighth example of an embodiment of the present invention explained in the context of FIGS. 8 and 9, the retaining bow 99 of the ninth example of the invention does no longer have any hole. This is an advantage because this renders any tilted position of the ball 95 impossible. By using the retaining bow 99 of the ninth example of an embodiment ball 95 is pressed always perpendicularly onto the valve seat formed on bore 96. A bowl-type spring retainer 102 preferably featuring a design characterized by rotation symmetry is arranged in compression chamber 85 and includes an annular, bent-off end portion 103 serving to support one side of the piston return spring 104. The other side of piston return spring 104 abuts on pump piston 6. Bowl-type spring retainer 102 includes a central axial bore 105 in order to ensure a flow communication of the pressure medium between compression chamber 85 and suction valve 82. Preferably, a further means for flow communication of the pressure medium is provided on the periphery of the bowl-type spring retainer 102 in that, on the periphery, webs are provided in a manner not shown wherebetween pressure medium can flow. Further, bowl-type spring retainer 102 includes an annular recess 106 on its side facing suction valve 82, this recess 106 serving to support one side of compression spring 101 of the suction valve 82. A portion 107 which projects towards the side of suction valve 82 and wherein bore 105 is formed and the outside of which corresponds to the inside of recess 106 also serves as a stop for the suction valve body, i.e. for the ball 83. Please note that the bowl-type spring retainer 102 represented in FIG. 10 is made of plastic which renders a considerably simplified manufacture as compared with the sheet-metal retaining cage 87 of the example of an embodiment represented in FIG. 8. Because of portion 107 of bowl-type spring retainer 102 it is impossible for ball 83 to become jammed in the otherwise conically shaped bowl-type spring retainer 102.

A tenth example of an embodiment of the present invention is represented in FIGS. 12 and 13. The tenth example of an embodiment of the present invention represented in FIGS. 12 and 13 in particular differs from the eighth and ninth examples of embodiments with regard to the design of delivery valve 81. A sheet-metal strip bent to form a clamp 110 is provided as spring means for pressing ball 95 against the valve seat of delivery valve 81. About mid-way, an inventive tongue 111 is worked out of clamp 110. Ball 95 is pressed against its valve seat by means of tongue 111 with a defined force. So as to prevent the clamp 110 from twisting, clamp 110 of this embodiment includes two depressed peripheral portions or tabs 112, 113 engaging groove 97. Thus clamp 110 is fixed on the valve seat member. Further, clamp 110 includes bent ends 114, 115 on both of its cross sides. These ends facilitate mounting clamp 110 onto the valve seat member.

Referring to FIGS. 14 through 16, an eleventh example of an embodiment of the present invention is described in the following, with FIG. 16 representing a section through FIG. 14 along line XVI—XVI. As distinguished from the tenth example of an embodiment of the present invention represented in FIGS. 12 and 13, clamp 120 has been widened considerably, it thus extends on the outside of cartridge 8 beyond the groove 97 towards the eccentric 4. Because of the widening of clamp 120 the same is held on cartridge 8 only by its resiliency. Thus no further measures such as welding or caulking are required to fasten clamp 120 on cartridge 8. According to this invention, ball 95 is pressed against its valve seat by a tongue 121 formed within the clamp 120. Please note that tongue 121 extends almost over half of the length of clamp 120. A tab 123 formed within a recess 122 on the front side of clamp 120 serves to fix clamp 120 on cartridge 8. Please note that, as contrasted with the tenth example of an embodiment, clamp 120 which is embodied in the eleventh example of an embodiment represented in FIGS. 14 through 16 is fixed on cartridge 8 essentially perpendicularly to the resilient action of retaining clamp 120. Thereby twisting of clamp 120 on cartridge 8 is excluded to a great extent. Further, according to this invention, the prestressing force of tongue 121 towards ball 95 can be determined ore accurately. A bore 124 formed within cartridge 8 is provided for tab 123 so that the latter can be slipped thereinto and in order to avoid any displacement or twisting, respectively, of clamp 120. It can be noticed particularly from the representation of FIGS. 15 and 16 that clamp 120 extends over half of the periphery of cartridge 8 and, preferably, approximately over two thirds of the periphery of cartridge 8. Finally, please note that the suction valve body 125 of the eleventh example of an embodiment of this invention is shaped like a hammer and that, on its front side which serves as closure member, it is essentially conical or spherical, with the valve seat then likewise having a conical or spherical shape. On its opposite front side, the hammer-shaped valve body 125 preferably includes an annular groove 126 for receiving and guiding compression spring 101 serving as suction valve spring.

What is claimed is:

1. Piston pump comprising:
   a pump housing,
   a piston,
   a suction valve,
   a pressure valve, wherein the suction valve and the pressure valve are arranged in a common cartridge, which is fastened to said housing of the piston pump wherein one of said pressure valve or said suction valve is arranged in a substantially axial direction and the other valve is arranged in a substantially radial direction with respect to a center axis of the common cartridge component.

2. Piston pump according to claim 1, wherein the common cartridge includes a valve seat body, in which a valve seat for the pressure valve and a valve seat for the suction valve are arranged.

3. Piston pump according to claim 1, wherein the piston is designed as a pot-shaped piston, and wherein the an axially protruding thorn section which is guided into the pot-shaped piston.

4. Piston pump according to claim 1, wherein the common cartridge includes a valve seat body with an axial recess located at one of its faces, and wherein the pump piston is guided in said axial recess.

5. Piston pump according to claim 4, wherein the suction valve is arranged on an opposite face of the valve seat body, substantially coaxial with the center axis of the valve seat body.

6. Piston pump according to claim 4, wherein the pressure valve is arranged substantially radially with respect to the center axis of the valve seat body.

7. Piston pump according to claim 1, wherein the suction valve includes a compression spring secured with a retainer pot, wherein the retainer pot includes a shaped-on stop for the valve body of the suction valve, and wherein the retainer pot includes means for guiding the compression spring and means for guiding a piston return spring.

8. Piston pump according to claim 7, wherein said means for guiding the compression spring and said means for guiding the piston return spring are a pot-like section of the retainer pot, wherein, on an inside portion of the pot-like section, the compression spring and, on an outside of the pot-like section, the piston return spring is guided.

9. Piston pump according to claim 7, wherein the pressure valve is biased by means of a clamp element fastenable on the valve seat body toward a valve seat arranged in the valve seat body, wherein the clamp element has a tongue formed thereon, which biases the valve body toward the valve seat.

10. Piston pump according to claim 9, wherein the clamp element has a flap, which is arranged substantially perpendicular to the tongue, for fastening the clamp element to the valve seat body.

11. Piston pump according to claim 9, wherein the clamp element has a flap, which is arranged substantially in parallel to the tongue, for fastening the clamp element in a recess that accommodates the valve body in the valve seat body.

12. Piston pump according to claim 9, wherein the clamp element is fastened on the valve seat body by means of caulking.

13. Piston pump according to claim 9, wherein the clamp element is wider than the valve body.

14. Piston pump according to claim 9, wherein the clamp element includes lateral sides that terminate into end sections that arch outwardly.

* * * * *